(12) United States Patent
Huang

(10) Patent No.: US 8,842,943 B2
(45) Date of Patent: Sep. 23, 2014

(54) LOW POWER ELECTRO-OPTIC MODULATOR

(71) Applicant: Hsin-Shun Huang, New Taipei (TW)

(72) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/631,757

(22) Filed: Sep. 28, 2012

(65) Prior Publication Data

US 2013/0308892 A1 Nov. 21, 2013

(30) Foreign Application Priority Data

May 18, 2012 (TW) .............................. 101117927 A

(51) Int. Cl.
*G02F 1/035* (2006.01)
*G02B 6/26* (2006.01)
*G02B 6/42* (2006.01)

(52) U.S. Cl.
USPC ................ 385/3; 385/1; 385/2; 385/4; 385/8; 385/39; 385/40; 385/45

(58) Field of Classification Search
CPC ....... G02F 1/025; G02F 1/0316; G02F 1/035; G02B 6/12; G02B 6/134; G02B 6/1342
USPC .................................................... 385/3
See application file for complete search history.

(56) References Cited

U.S. PATENT DOCUMENTS

2004/0052442 A1* 3/2004 Li et al. .............................. 385/3
2006/0029319 A1* 2/2006 Sugiyama .......................... 385/1
2006/0228065 A1* 10/2006 Burns ................................ 385/3

* cited by examiner

*Primary Examiner* — Ryan Lepisto
(74) *Attorney, Agent, or Firm* — Novak Druce Connolly Bove + Quigg LLP

(57) ABSTRACT

An electro-optic modulator includes a substrate comprising a surface, a pair of transmission lines formed in the surface and extending substantially in parallel with each other, a pair of first strip electrodes formed on the surface and covering the respective transmission lines, and a pair of second strip electrodes positioned at two sides of the first strip electrodes and parallel with the first strip electrodes.

8 Claims, 2 Drawing Sheets

LOW POWER ELECTRO-OPTIC MODULATOR

BACKGROUND

1. Technical Field

The present disclosure relates to high-speed telecommunication technologies, and particularly to a low power electro-optic modulator for use in high-speed telecommunication.

2. Description of Related Art

Electro-optic modulators include a substrate, a waveguide, and electrodes. The waveguide is implanted in the substrate. A drive voltage is applied to the electrodes to form electric modulating fields. The electric modulating fields effect a change in the refractive index of the waveguide and thus alter a phase of lightwaves traversing the waveguide, which is known as the electro-optic effect, thus permitting modulation of an output optical signal from the waveguide. However, a power consumption of the electro-optic modulator is often less than satisfactory as the electrodes are not reasonably configured.

Therefore, it is desirable to provide an electro-optic modulator which can overcome the above-mentioned shortcomings.

DETAILED DESCRIPTION

Embodiments of the disclosure will be described with reference to the accompanying drawings.

Figure 1:
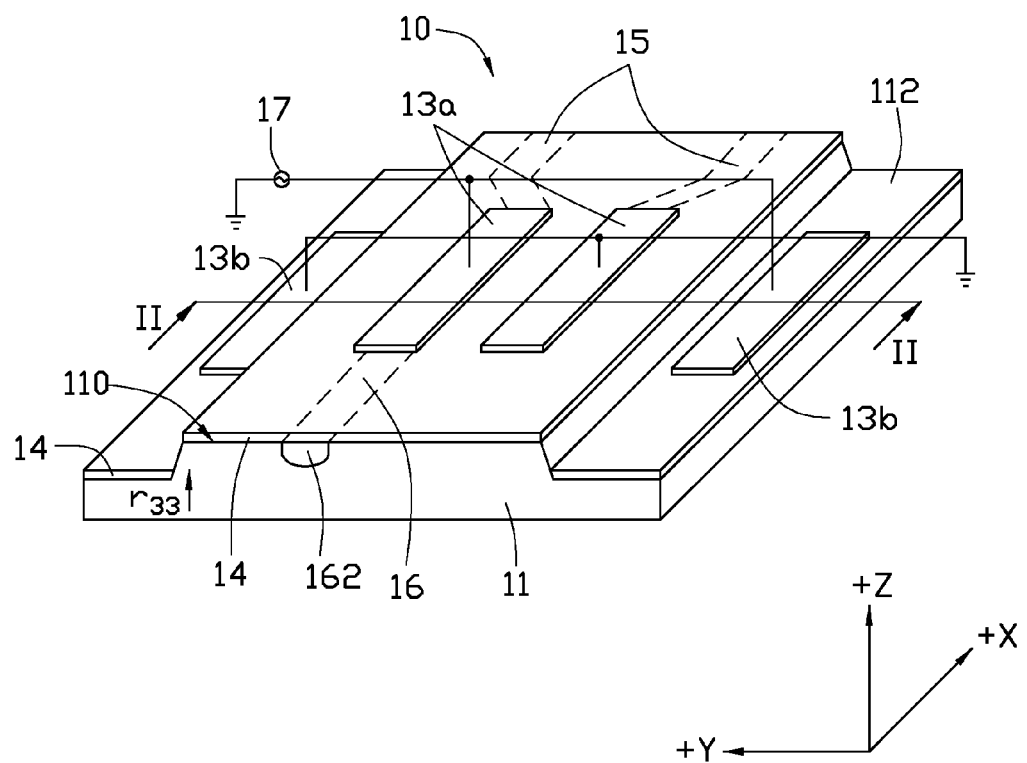
FIG. 1 is an isometric schematic view of an electro-optic modulator, according to an embodiment.
Figure 2:
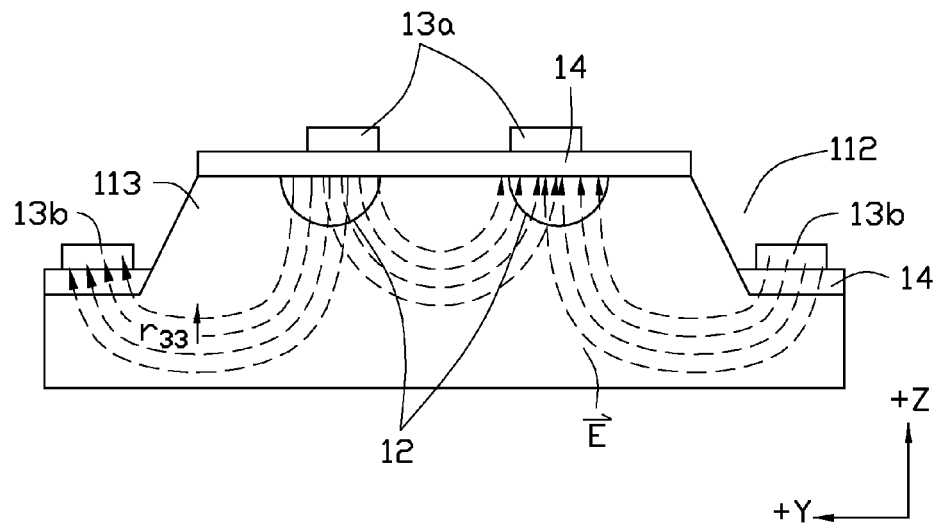
FIG. 2 is a cross-sectional view taken along a line II-II of FIG. 1.

Referring to FIGS. 1-2, an electro-optic modulator 10 includes a substrate 11, a pair of transmission lines 12, a pair of first electrodes 13a, and a pair of second electrodes 13b. The substrate 11 includes a first surface 110. The transmission lines 12, such as coplanar optical waveguides, are formed in the first surface 110 by metal diffusion and extend substantially parallel to each other. The first electrodes 13a are strip shaped and formed on the first surface 110, and cover the respective transmission lines 12. The second electrodes 13b are strip shaped and positioned on two sides of the first electrodes 13a, parallel with the first electrodes 13a.

In operation, a drive voltage is applied to the first electrodes 13a and the second electrodes 13b to form an electric modulating field E. The first electrodes 13a are of opposite polarities and the second electrodes 13b are also of opposite polarities. The electric modulating field E changes the refractive index of the transmission lines 12 and thus alters phases of lightwaves traversing the transmission lines 12. As such, lightwaves traversing the transmission lines 12 have different phases and result in constructive/destructive interference therebetween, permitting modulation of output optical signals from the transmission lines 12.

According to the principle of the electro-optic effect, the drive voltage $$V_\pi = k \frac{\lambda G}{n^3 r \Gamma L},$$

wherein k is a constant coefficient, $\lambda$ is a working wavelength of the lightwaves, G is a gap between the transmission lines 12, n is an effective linear part of the refractive index of the substrate 11, r is an electro-optic coefficient of the substrate 11 of a crystal axis that is parallel with the electric modulating field E, $\Gamma$ is a filed interaction factor which quantifies a strength of non-linear electric-optic interaction of the electric modulating field E and an optical field in the transmission line 12 in a cross-section of the transmission line 12, and L is a length of the transmission line 12. That is, the drive voltage $V_\pi$ a is inversely proportional to the field interaction factor $\Gamma$.

The field interaction factor $\Gamma$ is proportional to an overlap between the electric modulating field E and the optical field in the cross section of the transmission line 12. As the lightwaves is limited within the transmission line 12, the maximum overlap is the cross-section of the transmission line 12. In the embodiment, by constructing and arranging the first electrodes 13a and the second electrodes 13b as above-described, the electric modulating field E passes the whole cross-section of the transmission line 12. As such, the overlap approaches the maximum value and accordingly the field interaction factor $\Gamma$ approaches the maximum value. Thereby, the drive voltage $V_\pi$ can be reduced to the minimum extent, and a power consumption of the electro-optic modulator 10 is reduced correspondingly.

The substrate 11 can be made from lithium niobate ($LiNbO_3$) to increase the bandwidth of the electro-optic modulator 10 as the $LiNbO_3$ has a relative quick response speed.

The transmission lines 12 constitute a directional coupler. The electric-optic modulator 10 can be a ridge-type directional coupler to increase couple efficiency, improve mismatch between wave speeds of the electric modulating field E and the optical field, and increase the field interaction factor $\Gamma$. In the embodiment, the substrate 11 is substantially cubic and defines two cutouts 112 in the first surface 110 at two sides of the transmission lines 12, to from a ridge 113 between the cutouts 112. The transmission lines 12 and the first electrodes 13a are positioned on the ridge 113 of the substrate 11. The second electrodes 13b are positioned on bottom surfaces of the cutouts 112.

As the drive voltage $V_\pi$ is inversely proportional to the electro-optic coefficient of the substrate 11 of the crystal axis that is parallel to the electric modulating field E, and the electro-optic coefficient of the $LiNbO_3$ of +Z crystal axis $r_{33}$ is the maximum one ($30.8 \times 10^{-12}$ m/V), the electro-optic modulator 10 is +Z cut. That is, the +Z crystal axis of the $LiNbO_3$ substrate 11 is substantially parallel with the electric modulating field E.

The electro-optic modulator 10 also includes an isolating layer 14 on the first surface 110 and the bottom surfaces of the cutouts 112 to further improve mismatch of the wave speeds of the electric modulating field E and the optical field. The first electrodes 13a and the second electrodes 13b are positioned on the isolating layer 14. The isolating layer 14 can be dioxide silicon ($SiO_2$).

Each of the transmission lines 12 has a semi-cylinder configuration and an output section 15 extending out from one end thereof and for coupling an optical fiber (not shown). One of the transmission lines 12 has an input section 16 extending from another end thereof opposite to the corresponding output section 15 and forms an entrance 162 at a side of the substrate 11.

The first electrodes 13a and the second electrodes 13b are connected to a direct current (DC) or a low-frequency power source 17 and thus have the opposite polarities.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electro-optic modulator, comprising:
    a substrate comprising a surface;
    a pair of transmission lines formed in the surface and extending substantially in parallel with each other;
    a pair of first strip electrodes formed on the surface and covering the respective transmission lines;
    a pair of second strip electrodes positioned at two sides of the first strip electrodes and parallel with the first strip electrodes; and
    a power source having opposite polarities and connected to the first strip electrodes and the second strip electrodes, the first strip electrodes being of opposite polarities, and the second strip electrodes being of opposite polarities.

2. The electro-optic modulator of claim 1, wherein the substrate is made from lithium niobate.

3. The electro-optic modulator of claim 2, wherein the electric-optic modulator is a ridge-type directional coupler, the substrate is substantially cuboid and defines two cutouts in the surface, at two sides of the transmission lines, to from a ridge between the cutouts, the transmission lines and the first strip electrodes are positioned on the ridge of the substrate, and the second strip electrodes are positioned on bottom surfaces of the cutouts, respectively.

4. The electro-optic modulator of claim 3, wherein the electro-optic modulator is +Z cut.

5. The electro-optic modulator of claim 3, wherein the electro-optic modulator comprises an isolating layer on the surface and the bottom surfaces of the cutouts, and the first strip electrodes and the second strip electrodes are positioned on the isolating layer.

6. The electro-optic modulator of claim 5, wherein the isolating layer is made from dioxide silicon.

7. The electro-optic modulator of claim 1, wherein the transmission lines are coplanar optical waveguides formed by metal diffusion.

8. The electro-optic modulator of claim 1, wherein each of the transmission lines has a semi-cylinder configuration and an output section extending out from one end thereof, and one of the transmission lines has an input section extending from another end thereof opposite to the corresponding output section and forms an entrance at a side of the substrate.

* * * * *